US008260990B2

(12) United States Patent
Codrescu et al.

(10) Patent No.: US 8,260,990 B2
(45) Date of Patent: Sep. 4, 2012

(54) SELECTIVE PRECLUSION OF A BUS ACCESS REQUEST

(75) Inventors: Lucian Codrescu, Austin, TX (US); Ajay Anant Ingle, Austin, TX (US); Christopher Edward Koob, Round Rock, TX (US); Erich James Plondke, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 232 days.

(21) Appl. No.: 11/942,282

(22) Filed: Nov. 19, 2007

(65) Prior Publication Data

US 2009/0132733 A1 May 21, 2009

(51) Int. Cl.
*G06F 13/00* (2006.01)
*G06F 9/30* (2006.01)
*G06F 9/46* (2006.01)

(52) U.S. Cl. .......................... 710/107; 712/207; 718/102
(58) Field of Classification Search .................... 710/52, 710/56, 57, 113, 116; 712/205–206, 214–215, 712/207; 718/1, 103, 107
See application file for complete search history.

(56) References Cited

U.S. PATENT DOCUMENTS

| 5,636,364 | A |   | 6/1997  | Emma et al. |
| 5,828,860 | A | * | 10/1998 | Miyaoku et al. ............. 712/207 |
| 6,061,710 | A | * | 5/2000  | Eickemeyer et al. ......... 718/107 |
| 6,073,159 | A | * | 6/2000  | Emer et al. .................... 718/103 |
| 6,233,645 | B1 | * | 5/2001  | Chrysos et al. ............... 710/244 |
| 6,470,427 | B1 |   | 10/2002 | Arimilli et al. |
| 6,470,443 | B1 | * | 10/2002 | Emer et al. .................... 712/205 |
| 6,651,158 | B2 | * | 11/2003 | Burns et al. ................... 712/205 |
| 6,658,447 | B2 | * | 12/2003 | Cota-Robles ................. 718/103 |
| 6,832,280 | B2 |   | 12/2004 | Malik et al. |
| 6,982,956 | B2 | * | 1/2006  | Blanc et al. ................... 370/235 |
| 6,983,356 | B2 |   | 1/2006  | Rotithor et al. |
| 7,010,669 | B2 | * | 3/2006  | Burns et al. ................... 712/205 |
| 7,177,985 | B1 | * | 2/2007  | Diefendorff ................... 711/137 |
| 7,313,673 | B2 | * | 12/2007 | Abernathy et al. ........... 712/214 |
| 7,360,062 | B2 | * | 4/2008  | Kalla et al. .................... 712/215 |
| 7,366,877 | B2 | * | 4/2008  | Augsburg et al. ............. 712/214 |
| 7,366,878 | B1 | * | 4/2008  | Mills et al. .................... 712/214 |
| 7,480,769 | B2 |   | 1/2009  | Diefendorff et al. |
| 7,518,993 | B1 | * | 4/2009  | Dennis .......................... 370/235 |
| 2006/0066623 | A1 | * | 3/2006  | Bowen .......................... 345/506 |
| 2008/0082789 | A1 | * | 4/2008  | Kang et al. .................... 712/205 |

OTHER PUBLICATIONS

International Search Report—PCT/US08/084049, International Search Authority—European Patent Office-Apr. 6, 2009.
Written Opinion—PCT/US08/084049, International Search Authority—European Patent Office-Apr. 6, 2009.

* cited by examiner

*Primary Examiner* — Paul R Myers
*Assistant Examiner* — Trisha Vu
(74) *Attorney, Agent, or Firm* — Peter Michael Kamarchik; Nicholas J. Pauley; Jonathan T. Velasco (57) ABSTRACT

A system and method for selective preclusion of bus access requests are disclosed. In an embodiment, a method includes determining a bus unit access setting at a logic circuit of a processor. The method also includes selectively precluding a bus unit access request based on the bus unit access setting.

31 Claims, 6 Drawing Sheets

SELECTIVE PRECLUSION OF A BUS ACCESS REQUEST

I. FIELD

The present disclosure is generally related to handling bus access requests.

II. DESCRIPTION OF RELATED ART

Advances in technology have resulted in smaller and more powerful personal computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and IP telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Performance of electronic devices may be improved by reducing delays caused by memory access. Commonly, memory is located off-chip and is accessible to a processor via a bus, which may cause a processor to stall while requested data or instructions are retrieved from the memory. To reduce such delays, electronic devices often have one or more caches that provide faster processor access to data or instructions stored at the cache. A processor may generate "prefetch" requests to retrieve data or instructions from the memory and store the data or instructions at the cache in anticipation of a request for the retrieved data or instructions from memory. Prefetch requests may result from a software command or may be automatically generated by hardware.

Although prefetch requests can reduce processing delays by increasing the likelihood that data or instructions will be cached when requested, each prefetch request and memory access consumes system resources. In particular, bus resources to transmit the prefetch request to memory and to return requested data or instructions are consumed. When multiple processes share bus resources, access to the memory via the bus may be impaired for one or more processes due to prefetch requests that are generated by other processes.

III. SUMMARY

In a particular embodiment, a method is disclosed that includes determining a bus unit access setting at a logic circuit of a processor. The method also includes selectively precluding a bus unit access request based on the bus unit access setting. For example, bus access requests may be precluded by being intercepted and discarded, blocked, denied, or otherwise not acted upon.

In another particular embodiment, a processor is disclosed. The processor includes an execution unit configured to process an instruction to retrieve data. The processor includes a bus unit configured to process requests for access to a memory. The bus unit includes a buffer to store unprocessed requests. The processor further includes a logic circuit configured to selectively prevent data from being retrieved from the memory in response to a priority setting associated with the instruction and further in response to a state of the buffer.

In another particular embodiment, a system is disclosed. The system includes means for determining a priority setting associated with a particular thread at a multi-threaded processor. The system includes means for generating a request for data or instructions corresponding to the particular thread. The system also includes means for measuring a system capacity. The system further includes a logic circuit configured to selectively preclude the request for data or instructions in response to the priority setting and further in response to the system capacity.

A particular advantage provided by disclosed embodiments is improved device performance where bus access requests for lower priority threads may be denied in order to improve access for higher priority threads based on available system resources.

Other aspects, advantages, and features of the present disclosure will become apparent after review of the entire application, including the following sections: Brief Description of the Drawings, Detailed Description, and the Claims.

V. DETAILED DESCRIPTION

Figure 1:
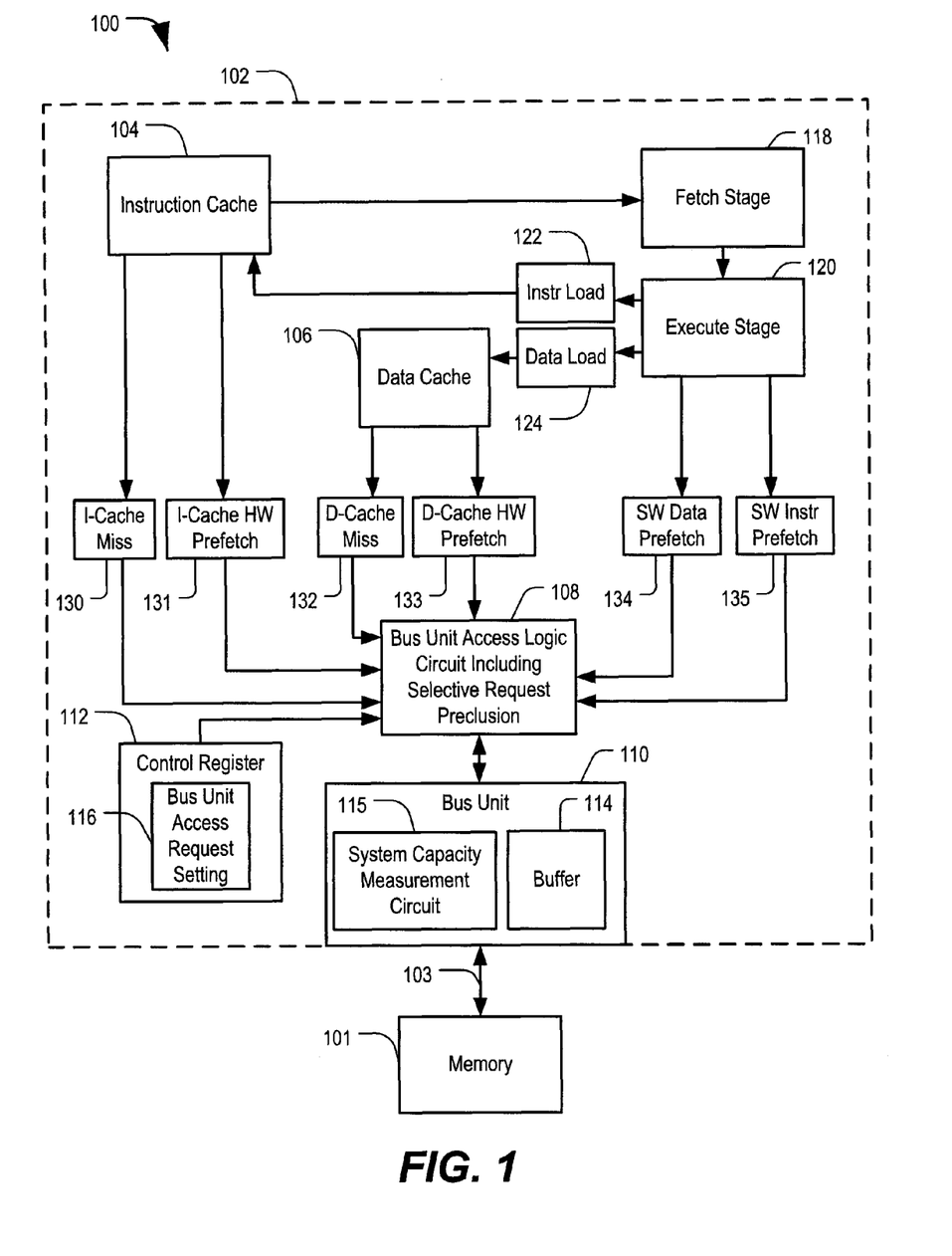
FIG. 1 is a block diagram of an embodiment of a system.

Referring to FIG. 1, a system is depicted and generally designated 100. The system 100 includes a memory 101 coupled to a processor 102 via a bus 103. The processor 102 includes an instruction cache 104, a data cache 106, and a bus unit access logic circuit including selective request preclusion 108. The bus unit access logic circuit including selective request preclusion 108 is coupled to receive bus access requests via the instruction cache 104 and the data cache 106 and to selectively provide bus access requests to a bus unit 110. The bus unit access logic circuit including selective request preclusion 108 is further coupled to a control register 112 that includes a bus unit access request setting 116.

The processor 102 includes a pipeline that has a fetch stage 118 and an execute stage 120. The fetch stage 118 is coupled to receive program instructions from the instruction cache 104 and to provide the instructions to the execute stage 120. The execute stage 120 is configured to execute the instructions received from the fetch stage 118, such as an instruction load command 122 or a data load command 124. In a particular embodiment, the execute stage 120 is configured to process instructions such as a software data prefetch command 134 and a software instruction prefetch command 135.

In a particular embodiment, the processor 102 supports multiple concurrent processes that share common resources, such as the instruction cache 104, the data cache 106, and the bus unit 110. In an illustrative embodiment, the processor 102 is a multi-threaded processor capable of concurrently processing multiple processing threads. In another illustrative embodiment, the processor 102 may include multiple processing cores.

In a particular embodiment, the instruction cache 104 is configured to receive requests for data including program instructions, such as the instruction load request 122, and to provide requested data when the data is determined to be stored at the instruction cache 104. The instruction cache 104 is further configured to generate an instruction cache miss request 130 when the requested data is not stored at the instruction cache 104. The instruction cache miss request 130 includes a request to access the memory bus 103 to retrieve the requested data from the memory 101. In a particular embodiment, the instruction cache 104 is also configured to automatically create an instruction cache hardware-generated prefetch request 131. For example, the instruction cache 104 may be configured to generate prefetch commands in response to an instruction cache 104 miss, in response to detection of a pattern of instruction request addresses, or may automatically request one or more next sequential instruction addresses in response to receiving a request for an instruction, or any combination thereof.

Similarly, in a particular embodiment, the data cache 106 is configured to receive requests for data, such as the data load request 124, from the execute stage 120. The data cache 106 is configured to determine whether requested data is stored at the data cache 106, and to generate a data cache miss request 132 when the requested data is not stored at the data cache 106. The data cache miss request 132 includes a request to access the bus 103 to retrieve the requested data from the memory 101. In addition, in a particular embodiment, the data cache 106 may be configured to automatically create a data cache hardware-generated prefetch request 133. In a particular embodiment, the data cache 106 may be configured to automatically generate prefetch commands in response to a cache miss, in response to a detected pattern of data request addresses, in response other events detected at the data cache 106, or any combination thereof.

In a particular embodiment, the bus unit access logic circuit including selective request preclusion 108 is configured to receive bus unit access requests, including an instruction cache miss request 130, an instruction cache hardware-generated prefetch request 131, a data cache miss request 132, a data cache hardware-generated prefetch request 133, a software-generated data prefetch request 134, a software-generated instruction prefetch request 135, or any combination thereof. The bus unit access logic circuit including selective request preclusion 108 may be configured to preclude any or all of the requests 130-135 in response to a value of the bus unit access request setting 116. For example, the requests 130-135 may be precluded by being intercepted and discarded, blocked, denied, or otherwise not acted upon. The bus unit access logic circuit including selective request preclusion 108 may also be configured to receive from the bus unit 110 a capacity of a system resource, such as a buffer 114, as determined by a system capacity measurement circuit 115.

In an illustrative embodiment, the bus unit access request setting 116 may include one or more quality of service (QoS) parameters. For example, the bus unit access request setting 116 may include a QoS parameter indicating that an instruction cache hardware-generated prefetch request 131, a data cache hardware-generated prefetch request 133, or any combination thereof, may be selectively precluded based on a comparison of a system capacity to a threshold value. As another example, the bus unit access request setting 116 may include one or more QoS parameters indicating that an instruction cache miss request 130, a data cache miss request 132, or any combination thereof, may be selectively precluded based on a comparison of a system capacity to a threshold value. Further, the bus unit access logic circuit including selective request preclusion 108 may be configured to selectively preclude the software data prefetch request 134, the software instruction prefetch request 135, or any combination thereof, based on one or more QoS parameters of the bus unit access request setting 116.

In a particular embodiment, the bus unit 110 may be configured to receive and process bus access requests, such as a request for access to the memory 101 via the bus 103. The bus unit 110 may be configured to store unprocessed requests in the buffer 114, such as a queue, when the received requests arrive at the bus unit 110 faster than the requests can be sent via the bus 103. In a particular embodiment, the system capacity measurement circuit 115 may be configured to determine a depth of the buffer 114. For example, the system capacity measurement circuit 115 may be configured to determine a total number of pending requests in the buffer 114, a percentage of capacity of the buffer 114 that is used by pending requests, a predicted amount of time to process a request based on a used capacity of the buffer 114, other system capacity measurements related to received requests and transmissions via the bus 103, or any combination thereof.

During operation, in a particular embodiment, the bus unit access logic circuit including selective request preclusion 108 may preclude a request by intercepting one or more requests 130-135 and may determine whether to discard the request or to send the request to the bus unit 110, based on the bus unit access request setting 116 associated with the request. As an illustrative example, the bus unit access control setting 116 for a first processing thread may include QoS parameters indicating that the first thread has a high-priority and that all requests 130-135 associated with the first processing thread may be sent to the bus unit 110. However, the bus unit access request setting 116 for a second processing thread may include QoS parameters indicating that the second thread has a lower-priority and that one or more categories of the requests 130-135 may be selectively denied based on a queue depth of the buffer 114.

For example, software-generated prefetch requests 134-135 may be generated as often as every processing cycle and may consume significant bus resources. Therefore, a QoS parameter for a low-priority thread may indicate that one or both of the software-generated prefetch requests 134-135 are to be rejected when the buffer 114 is greater than one-quarter full of pending requests. As another example, the hardware-generated prefetch requests 131 and 133 may only be generated while a processing thread is executing and may not be generated when the thread is stalled, such as while data is retrieved from the memory 101. Therefore, a QoS parameter may indicate that one or both of the hardware-generated prefetch requests 131 and 133 are to be rejected when the buffer 114 is greater than one-half full. As another example, the cache miss requests 130 and 132 may occur when a processing thread requests instructions or data to be retrieved from the memory 101. The cache miss requests 130 and 132 indicate that a processing thread is stalled until the request is fulfilled. Therefore, for a low priority thread, a QoS parameter may indicate that one or both of the cache miss requests 130 and 132 are to be rejected when the buffer 114 is greater than three-quarters full.

It will be understood by one of skill in the art that other QoS parameters, system capacity thresholds, and categories of requests may be provided or used based on system and design requirements. It will also be understood that various configurations of bus access requests and requestors may be included. For example, in an illustrative embodiment, software-generated prefetch requests may originate at a cache, rather than an execution unit as depicted in FIG. 1, when the cache receives a software prefetch command for data that is subsequently determined to not be stored at the cache.

Figure 2:
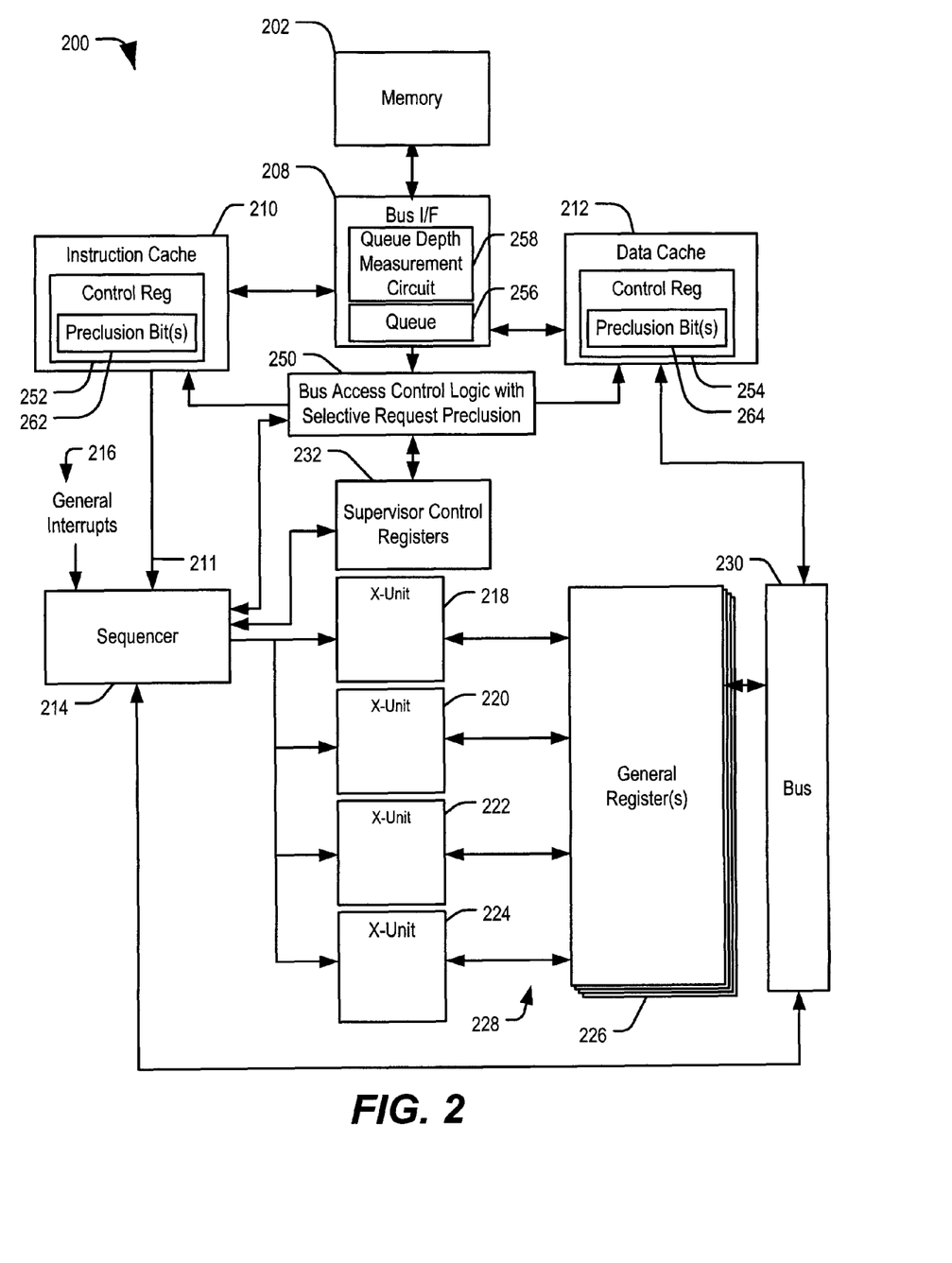
FIG. 2 is a block diagram of an embodiment of a processing system.

Referring to FIG. 2, a particular illustrative embodiment of a processing system is depicted and generally designated 200. The processing system 200 includes a memory 202 that is coupled to an instruction cache 210 via a bus interface 208. The processing system 200 also includes a data cache 212 that is coupled to the memory 202 via the bus interface 208. The instruction cache 210 is coupled to a sequencer 214 via a bus 211. In a particular example, the sequencer 214 can also receive general interrupts 216, which may be retrieved from an interrupt register (not shown). In a particular embodiment, the instruction cache 210 may be coupled to the sequencer 214 via a plurality of current instruction registers, which may be coupled to the bus 211 and associated with particular threads of the processing system 200. In a particular embodiment, the processing system 200 is an interleaved multi-threaded processor including six threads.

In a particular embodiment, the bus 211 is a sixty-four (64)-bit bus and the sequencer 214 is configured to retrieve instructions from the memory 202 via instruction packets that include multiple instructions having a length of thirty-two (32) bits each. The bus 211 is coupled to a first instruction execution unit 218, a second instruction execution unit 220, a third instruction execution unit 222, and a fourth instruction execution unit 224. Each instruction execution unit 218, 220, 222, 224 can be coupled to a general register file 226 via a second bus 228. The general register file 226 can also be coupled to the sequencer 214 and to the data cache 212 via a third bus 230.

The processing system 200 may also include supervisor control registers 232 to store one or more priority settings that may be accessed by a bus access control logic circuit with selective request preclusion 250 to determine whether to block or to allow bus access requests. Each processing thread may have one or more associated priority settings, such as one or more bit values stored at a supervisor status register that is dedicated to the particular thread. In a particular embodiment, bus access requests can be generated at the instruction cache 210, at the data cache 212, at one or more of the execution units 218, 220, 222, 224, or any combination thereof, and may include requests for data stored at the memory 202.

In a particular embodiment, the instruction cache 210 includes circuitry to generate requests for data at the memory 202, such as a cache miss request, a hardware-generated prefetch request, a prefetch request responsive to a received software-generated prefetch command, or any combination thereof. The instruction cache 210 includes a control register 252 that stores one or more preclusion bits 262, which are accessible to and may be modified by the bus access control logic circuit with selective request preclusion 250. The instruction cache 210 may also be configured to block any or all of the requests for data stored at the memory 202, and to selectively prevent such requests from being sent to the bus interface 208 based on the preclusion bits 262.

Likewise, in a particular embodiment, the data cache 212 includes circuitry to generate requests for data stored at the memory 202, such as a cache miss request, a hardware-generated prefetch request, a prefetch request responsive to a received software-generated prefetch command, or any combination thereof. The data cache 212 includes a control register 254 that stores one or more preclusion bits 264, which are accessible to and may be modified by the bus access control logic circuit with selective request preclusion 250. The data cache 212 may also be configured to block any or all of the requests for data stored at the memory 202, and to selectively prevent such requests from being sent to the bus interface 208 based on the preclusion bits 264.

The bus access control logic circuit with selective request preclusion 250 is configured to set the preclusion bits 262 and 264 based on a thread priority setting stored at the supervisor control registers 232 and further based on a buffer capacity, such as a depth of a queue 256 at the bus interface 208, as determined by a queue depth measurement circuit 258. By setting the preclusion bits 262 and 264, the instruction cache 210 and the data cache 212 are instructed to selectively block requests for access to the memory 202 via the bus interface 208.

During operation, one or more instructions executed at the execution units 218-224 may result in a request for data at the memory 202 that includes a bus access request. For example, a request for data at the memory 202 may be generated in response to a cache miss at the instruction cache 210, a prefetch request automatically generated by hardware at the instruction cache 210, a cache miss at the data cache 212, a prefetch request automatically generated at the data cache 212, or a software generated prefetch request that is received at the instruction cache 210 or the data cache 212.

The bus access control logic circuit with selective request preclusion 250 may be configured to selectively prevent the data from being retrieved from the memory 202 in response to a priority setting associated with the executed instruction that resulted in the request, and further in response to a state of the queue 256. The bus access control logic with selective request preclusion 250 may determine whether the queue depth exceeds a threshold, such as a capacity threshold for prefetch requests made by a low-priority thread, and may set one or more of the preclusion bits 262-264 accordingly.

Figure 3:
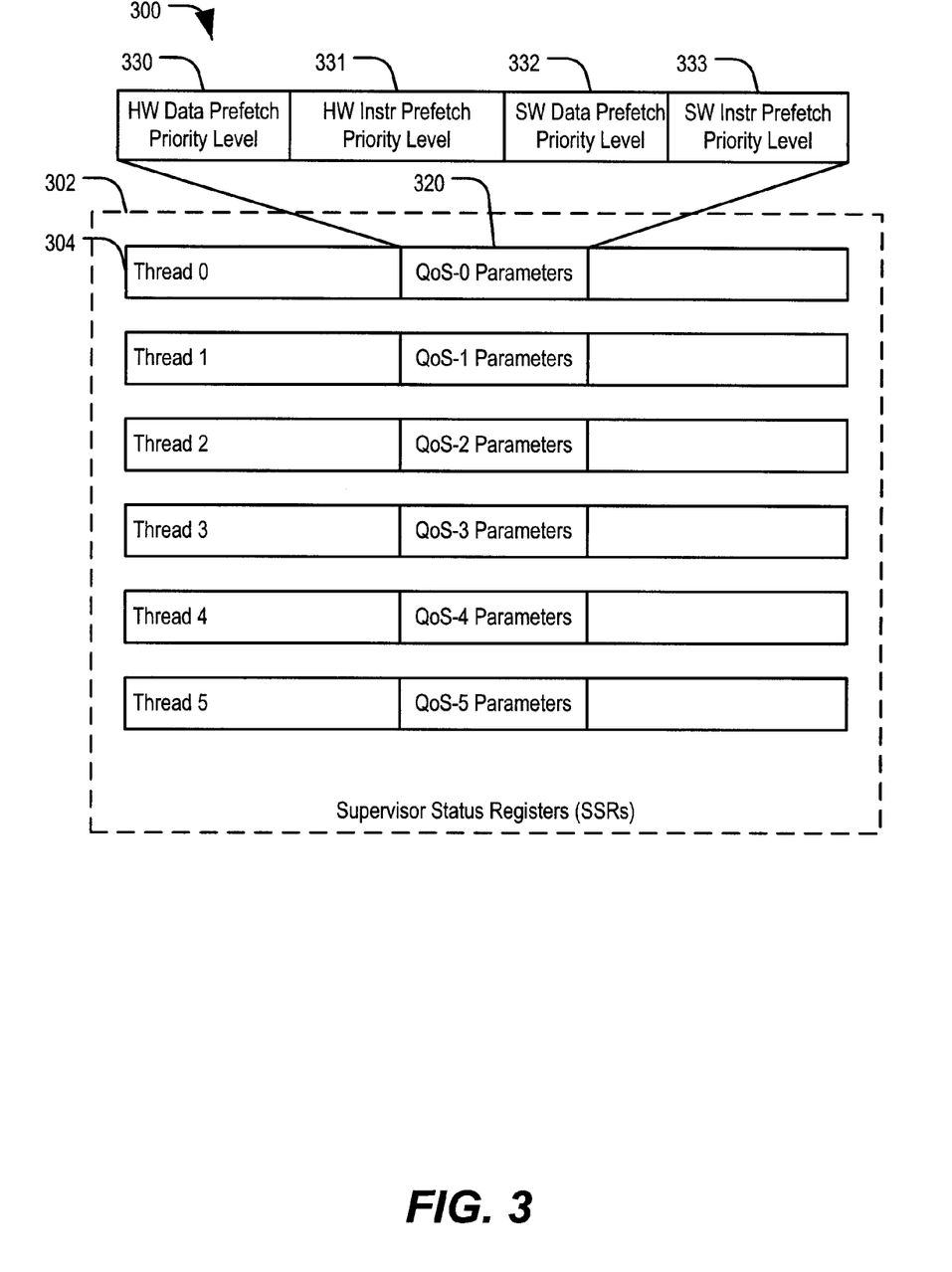
FIG. 3 is a block diagram of an embodiment of memory resources that can be used in a system.

Referring to FIG. 3, a system is depicted and generally designated 300. The system 300 includes a set of supervisor status registers (SSRs) 302. The SSRs include a status register for each of six representative processing threads, enumerated thread 0-thread 5. Each thread register, such as the representative register 304 for thread 0, includes a respective quality of service (QoS) parameter section, such as the representative QoS parameters section 320. The QoS parameters section 320 includes one or more quality of service parameter fields, such as a hardware data prefetch priority level field 330, a hardware instruction prefetch priority level field 331, a software data prefetch priority level field 332, a software instruction prefetch priority level field 333, other quality of service parameter value fields (not shown), or any combination thereof.

In a particular embodiment, the fields 330-333 may each include one or more bits. For example, the hardware data prefetch priority level field 330 may include a single bit such that a logical high value of the bit indicates a high priority thread and a logical low value of the bit indicates a low priority thread. Similarly, each of the other fields 331-333 may include one or more bits indicating one of more priority level values. In a particular embodiment, a logical high value in a priority level field may indicate that an associated bus access request is always granted. However, a low value of a priority level field may indicate that an associated bus access request is not granted when system resources are used above a certain threshold. For example, a low priority thread may be prevented from accessing the bus 203 of FIG. 2 when the queue 214 is determined to be in a state of usage exceeding a threshold amount associated with the priority level of the thread for the particular type of bus access request.

In an alternative embodiment, one or more of the fields 330-333 may encode a value indicating a threshold amount. For example, a 2-bit field may store values that indicate thresholds of zero, one-quarter, one-half, and three-quarters of a total system capacity, respectively. These threshold values may be used by a bus unit access logic circuit, such as the bus unit access logic circuit including selective request preclusion 108 of FIG. 1 or the bus access control logic circuit with selective request preclusion 250 of FIG. 2, in comparison to a system capacity, such as provided by the system capacity measurement circuit output 115 or the queue depth measurement circuit 258, respectively.

Figure 4:
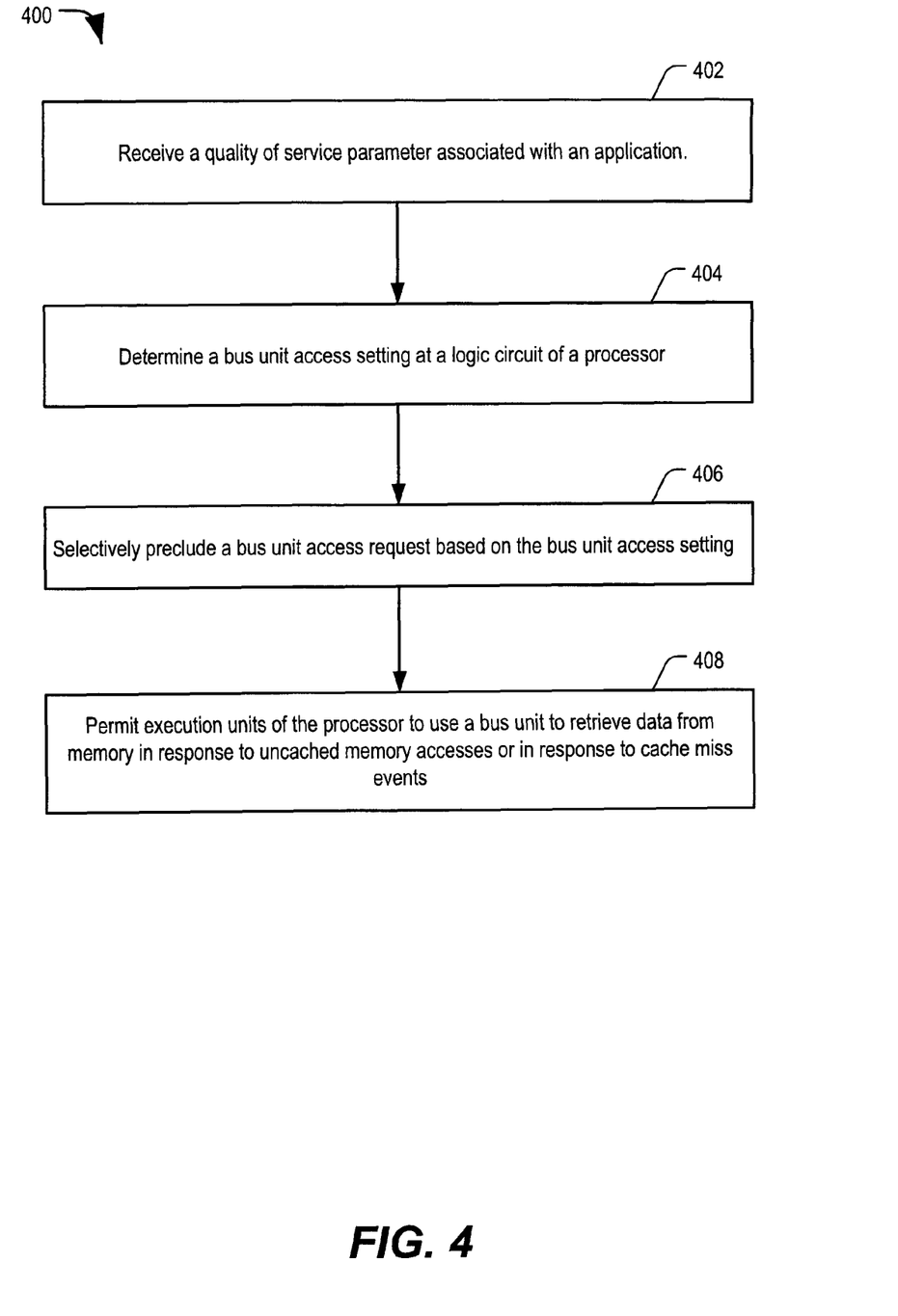
FIG. 4 is a flow chart of an embodiment of a method of selective preclusion.

Referring to FIG. 4, a particular illustrative embodiment of a method of selective preclusion is depicted and generally designated 400. In an illustrative embodiment, the method 400 may be performed by a bus unit access logic circuit, such as the bus unit access logic circuit including selective request preclusion 108 of FIG. 1 or the bus access control logic circuit with selective request preclusion 250 of FIG. 2.

In a particular embodiment, the method 400 includes receiving a quality of service parameter associated with an application, at 402. In an illustrative embodiment, the quality of service parameter is stored at a register, such as the representative QoS parameters 320 of FIG. 3. The quality of service parameter may include one or more settings indicating a thread priority or a threshold level above which bus access requests will be precluded. Bus access requests may be precluded by being intercepted and discarded, blocked, denied, or otherwise not acted upon.

Continuing to 404, a bus unit access setting is determined at a logic circuit of a processor. In a particular embodiment, the processor is a multi-threaded processor that includes a plurality of bus unit access settings. Each instruction thread of the multiple instruction threads may have a corresponding bus unit access setting. In a particular embodiment, a bus unit access setting may designate a quality of service level associated with the corresponding thread, an absolute priority level of the thread, a relative priority level of the thread in comparison to other threads, or a particular rank or level of bus access associated with the thread. In a particular embodiment, the bus unit access setting may indicate a minimum guaranteed access to bus resources for the corresponding thread during periods of heavy bus traffic due to other threads. In a particular embodiment, the bus unit access setting may include a bus unit threshold, such as a depth of a data queue. The logic circuit may be operable to selectively preclude bus unit access requests from multiple instruction threads on a thread by thread basis, such as by reading a bus unit access setting from a system register and performing a comparison between the bus unit access setting associated with the thread, a type of access request received by the thread, and one or more bus conditions.

In a particular embodiment, the bus unit access setting may include a bit flag of a supervisor status register. In another embodiment the bus unit access setting may include a guaranteed quality of service setting, a bit flag setting, a bus queue threshold, an enable or disable setting, or any combination thereof. As an illustrative example, the bus unit access setting may include a prefetching disabled setting.

Advancing to 406, a bus unit access request is selectively precluded based on the bus unit access setting. For example, the bus unit access request may include a prefetch instruction to request a cache to retrieve data or instructions from a memory before the data or instructions are needed by an execution unit of the processor. The bus unit access request may be received from a hardware unit or from a software command. The bus unit access request may include a data cache prefetch request or an instruction cache prefetch request.

In a particular embodiment, selectively precluding the bus unit access request is performed by a logic circuit of the processor that intercepts the bus unit access request and selectively discards the bus unit access request or sends the bus unit access request to a bus unit of the processor in response to the bus unit access setting. In a particular embodiment, selectively precluding includes precluding a hardware prefetch attempt to retrieve data from a memory with or without a cache miss. For example, hardware prefetch requests may be generated at a cache and precluded by the logic circuit independent of whether the request is generated in response to a cache miss or a cache hit. In another particular embodiment, a load instruction or a store instruction may be selectively precluded based on a quality of service parameter.

Proceeding to 408, in a particular embodiment, one or more execution units of the processor are permitted to use a bus unit to retrieve data from memory in response to uncached memory accesses or in response to cache miss events. However, in another embodiment, the uncached memory accesses or cache miss events may be associated with low-priority threads and the resulting bus access requests may be precluded to provide a quality of service performance level to a higher priority thread.

Figure 5:
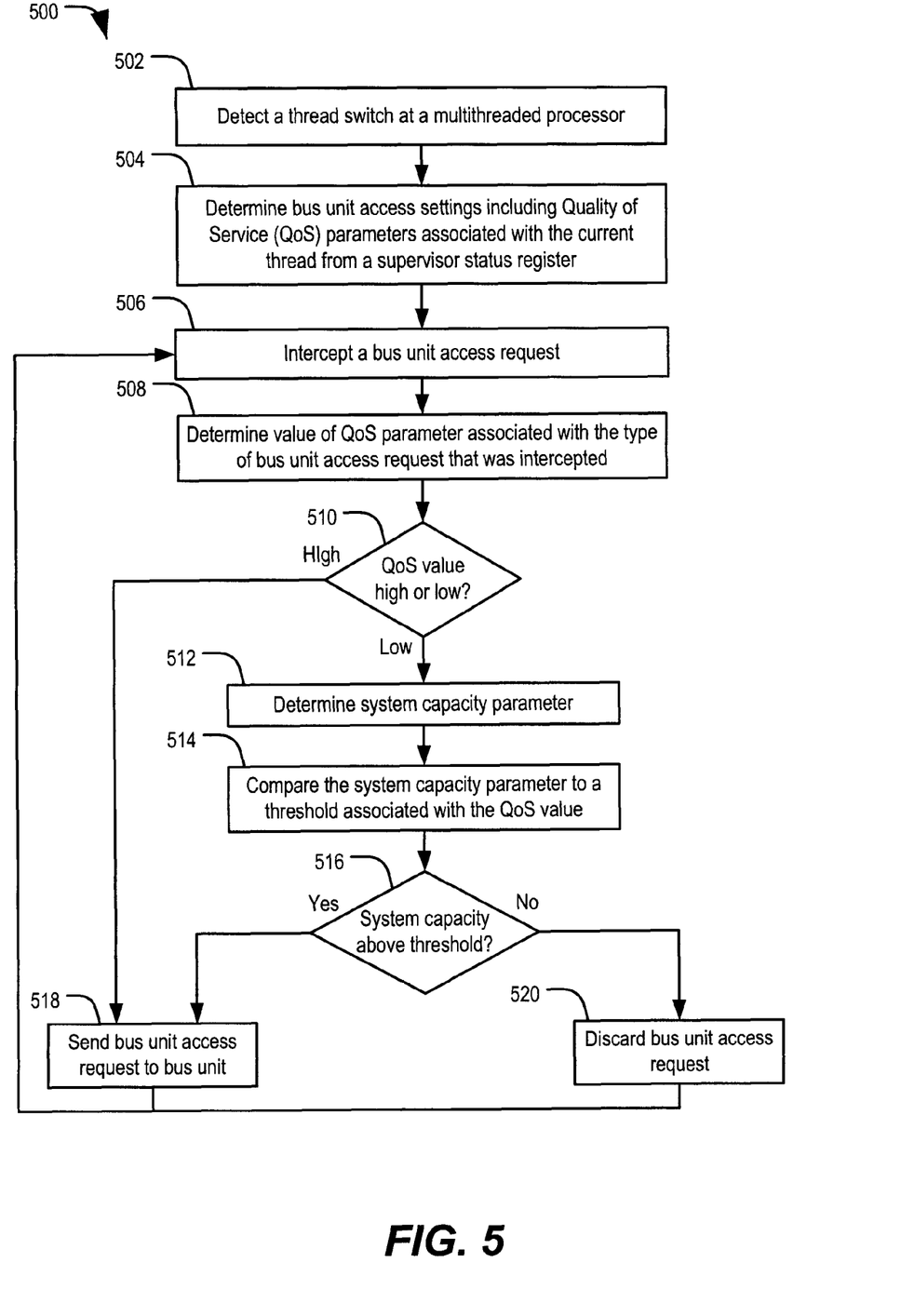
FIG. 5 is a flow chart of an embodiment of a method of handling bus access requests.

Referring to FIG. 5, a particular illustrative embodiment of a method of handling bus access requests is depicted and generally designated 500. At 502, a thread switch may be detected at a multi-threaded processor. In an illustrative embodiment, the multi-threaded processor may include the system 100 of FIG. 1 or the system 200 of FIG. 2.

Advancing to 504, bus unit access settings may be determined, including Quality of Service (QoS) parameters associated with a current thread from a supervisor status register. In an illustrative embodiment, the QoS parameters may include the memory resources 300, such as the representative QoS parameters 320, of FIG. 3.

Continuing to 506, a bus unit access request may be intercepted. In a particular embodiment, the bus unit access request may be intercepted at a control logic circuit, such as the bus unit access logic circuit including selective request preclusion 108 of FIG. 1. In another embodiment, the bus unit access request may be intercepted at a data cache or an instruction cache, such as the data cache 212 and instruction cache 210 in conformity with the respective preclusion bits 262-264 of FIG. 2.

Proceeding to 508, a value of a QoS parameter associated with the type of bus unit access request that was intercepted may be determined. In an illustrative embodiment, the type of bus unit access request may include an instruction cache miss request, an instruction cache hardware-generated prefetch request, a data cache miss request, a data cache hardware-generated prefetch request, a software-generated instruction prefetch request, and a software-generated data prefetch request, or any combination thereof, such as requests 130-135 of FIG. 1.

Moving to 510, a determination may be made whether the QoS parameter value is a high value or a low value. When the QoS parameter is determined to have a high value, such as for a high-priority thread corresponding to a modern application, processing may continue at 518, where the bus unit access request may be sent to the bus unit.

Alternatively, when the QoS parameter is determined at 510 to have a low value, processing advances to 512, where a system capacity parameter may be determined. In an illustrative embodiment, the system capacity parameter may be bus request storage buffer capacity, or a depth of a bus interface queue, such as the queue 256 of FIG. 2. In another embodiment, the system capacity parameter may include one or more other measurements of system capacity that may be associated with a QoS parameter on a thread-by-thread basis.

Continuing to 514, a comparison may be made of the system capacity parameter to a threshold associated with the QoS value. When the system capacity is determined to be above the threshold, at 516, processing proceeds to 518, where the bus unit access request is sent to the bus unit. Alternatively, when the system capacity is determined to be below the threshold, at 516, processing advances to 520, where the bus unit access request is discarded.

In a particular embodiment, processing may return from each of 518 and 520 to continue at 506, where a next bus unit access request is intercepted. In another embodiment, processing may instead return to 502 to detect a thread switch at a next processing cycle.

Figure 6:
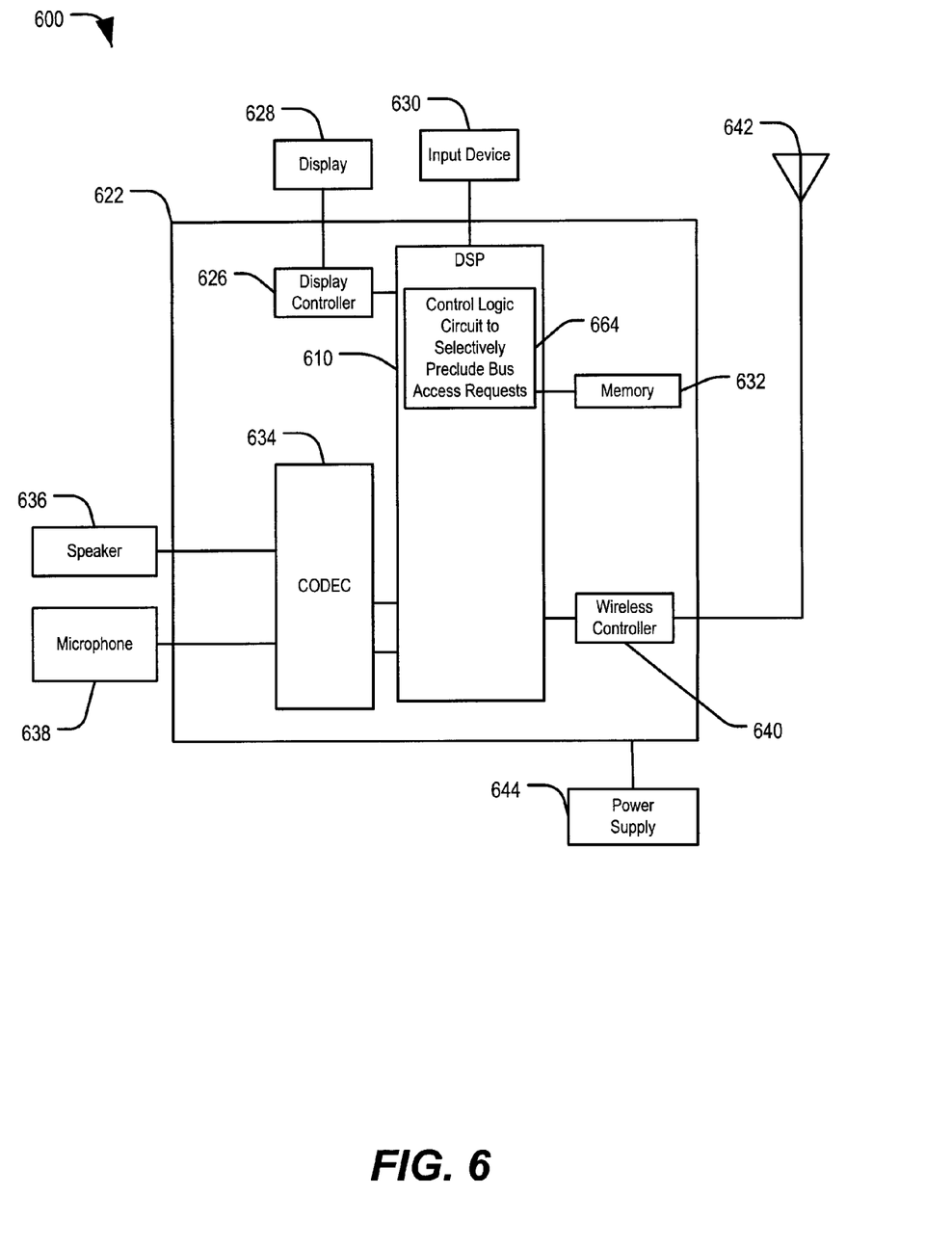
FIG. 6 is a block diagram of an illustrative communications device including logic to selectively preclude bus access requests.

FIG. 6 is a block diagram of a representative wireless communication device 600 including logic to selectively preclude bus access requests. The wireless communications device 600 can include a digital signal processor (DSP) 610 that includes a control logic circuit to selectively preclude bus access requests 664 that operates in accordance with the systems and methods as described with respect to FIGS. 1-5. The DSP 610 may be configured for multi-threaded operation, and each processing thread may be assigned one or more Quality of Service (QoS) parameters to indicate a priority of the thread to access a bus, such as a bus to access a memory 632.

FIG. 6 also shows a display controller 626 that is coupled to the digital signal processor 610 and to a display 628. Moreover, an input device 630 is coupled to the digital signal processor 610. Additionally, the memory 632 is coupled to the digital signal processor 610. A coder/decoder (CODEC) 634 can also be coupled to the digital signal processor 610. A speaker 636 and a microphone 638 can be coupled to the CODEC 634.

FIG. 6 also indicates that a wireless controller 640 can be coupled to the digital signal processor 610 and to a wireless antenna 642. In a particular embodiment, a power supply 644 is coupled to the on-chip system 622. Moreover, in a particular embodiment, as illustrated in FIG. 6, the display 628, the input device 630, the speaker 636, the microphone 638, the wireless antenna 642, and the power supply 644 are external to the on-chip system 622. However, each is coupled to a component of the on-chip system 622.

It should be understood that the control logic circuit to selectively preclude bus access requests 664 need not be limited to controlling requests to access the memory 632. Instead, the control logic circuit to selectively preclude bus access requests 664 may be operable to enforce a QoS policy on a thread-by-thread basis for access to the display controller 626, the CODEC 634, the wireless controller 640, any other component coupled to the DSP 610 via a bus, or any combination thereof.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined by the following claims.

What is claimed is:

1. A method comprising:
    determining, by a logic circuit via access to a control register, a first bus unit access setting for a first instruction thread of a multi-threaded processor;
    determining, by the logic circuit via access to the control register, a second bus unit access setting for a second instruction thread of the multi-threaded processor, wherein the second bus unit access setting is different than the first bus unit access setting;
    selectively discarding by the logic circuit a prefetch request associated with an instruction based on one of the first bus unit access setting and the second bus unit access setting, wherein discarding the prefetch request prevents the prefetch request from causing data or instructions to be prefetched.

2. The method of claim 1, wherein a logic circuit of the multi-threaded processor is operable to selectively discard prefetch requests from multiple instruction threads on a thread by thread basis, each instruction thread of the multiple instruction threads having a corresponding bus unit access setting.

3. The method of claim 1, wherein the prefetch request comprises a request of a cache to retrieve the data or instructions from a memory before the data or instructions are needed by an execution unit of the multi-threaded processor.

4. The method of claim 1, wherein the first bus unit access setting comprises a prefetching disabled setting.

5. The method of claim 1, further comprising permitting execution units of the multi-threaded processor to use a bus unit to retrieve data from a memory in response to cache miss events and to selectively route cache misses to the bus unit.

6. The method of claim 5, wherein selectively discarding includes precluding a hardware prefetch attempt to retrieve data from the memory with or without a cache miss.

7. The method of claim 1, wherein the first bus unit access setting comprises a guaranteed quality of service setting, a bit flag setting, a bus queue threshold, an enable or disable setting, or any combination thereof.

8. The method of claim 1, wherein the first bus unit access setting comprises a bit flag of a supervisor status register.

9. The method of claim 1, wherein the prefetch request is received from a hardware unit or from a software command.

10. The method of claim 1, wherein the prefetch request comprises a data cache prefetch request or an instruction cache prefetch request.

11. The method of claim 1, wherein the first bus unit access setting comprises a first bus unit threshold and the second bus unit access setting comprises a second bus unit threshold.

12. The method of claim 11, wherein the first bus unit threshold comprises a depth of a data queue.

13. The method of claim 1, further comprising receiving a first quality of service parameter from a first status register associated with the first instruction thread and a second quality of service parameter from a second status register associated with the second instruction thread.

14. A multi-threaded processor comprising:
an execution unit configured to process a first instruction to retrieve first data, the first instruction corresponding to a first instruction thread of the multi-threaded processor, wherein the first instruction thread has a first bus unit access setting, the execution unit further configured to process a second instruction to retrieve second data, the second instruction corresponding to a second instruction thread of the multi-threaded processor, wherein the second instruction thread has a second bus unit access setting;
a bus unit configured to process received requests for access to a memory corresponding to the first instruction thread and corresponding to the second instruction thread, the bus unit having a buffer to store unprocessed requests;
a first logic circuit configured to use a first prefetch request and a second prefetch request to request prefetching of the first data and the second data from the memory, wherein the first prefetch request is associated with the first data and the second prefetch request is associated with the second data; and
a second logic circuit configured to selectively prevent one of the first data and the second data from being retrieved from the memory by preventing one of the first prefetch request and the second prefetch request from reaching the memory in response to one of a first priority setting accessed from a control register by the second logic unit and a second priority setting accessed from the control register by the second logic unit, wherein the first priority setting is associated with the first instruction and the first bus unit access setting, wherein the second priority setting is associated with the second instruction and the second bus unit access setting, and wherein the one of the first prefetch request and the second prefetch request is prevented from reaching the memory by discarding the one of the first prefetch request and the second prefetch request.

15. The multi-threaded processor of claim 14, wherein the buffer includes a queue and wherein the second logic circuit is configured to selectively prevent the first data from being retrieved from the memory in response to a depth of the queue exceeding a threshold that is associated with the first bus unit access setting.

16. The multi-threaded processor of claim 14, further comprising a cache, wherein the first instruction is a load instruction and wherein the second logic circuit is configured to prevent the first data from being accessed from the memory in response to a cache miss.

17. The multi-threaded processor of claim 14, wherein the second logic circuit is further configured to selectively disable access to the memory in response to a hardware generated prefetch request that is associated with the first instruction.

18. A system comprising:
means for determining a first bus unit access setting associated with a first thread at a multi-threaded processor;
means for determining a second bus unit access setting associated with a second thread at the multi-threaded processor;
means for requesting, via a first prefetch request, prefetching of data or instructions corresponding to the first thread from a memory;
means for requesting, via a second prefetch request, prefetching of data or instructions corresponding to the second thread from the memory;
means for measuring a capacity of a buffer by determining a total number of pending requests in the buffer, a percentage of capacity of the buffer that is used by pending requests, and a predicted amount of time to process a request based on the used capacity of the buffer; and
means for selectively preventing one of the first prefetch request and the second prefetch request from reaching the memory by discarding the one of the first prefetch request and the second prefetch request in response to one of the first bus unit access setting and the second bus unit access setting, and further in response to the capacity of the buffer.

19. The system of claim 18, wherein the first bus unit access setting includes at least one bit value stored at a supervisor status register that is dedicated to the first thread.

20. The system of claim 18, wherein the means for selectively preventing is configured to disable a software generated prefetch request on the first thread when the first bus unit access setting indicates a low priority and when a system capacity is below a threshold.

21. The system of claim 20, wherein the means for requesting via the first prefetch request includes a cache that is configured to generate the first prefetch request in response to a cache miss, and wherein the means for selectively preventing is configured to prevent the first prefetch request from being received at a bus unit.

22. A method comprising:
determining a first bus unit access setting at a logic circuit of a processor via access by the logic circuit to a control register;
determining a second bus unit access setting at the logic circuit of the processor via access by the logic circuit to the control register, wherein the second bus unit access setting is different than the first bus unit access setting;
requesting prefetching of data or instructions from a memory via a prefetch request;
selectively preventing, by the logic circuit, the prefetch request from reaching the memory by discarding the prefetch request based on one of the first bus unit access setting and the second bus unit access setting; and
permitting execution units of the processor to use a bus unit to retrieve data from the memory in response to cache miss events and to selectively route cache misses to the bus unit.

23. The method of claim 22, wherein the processor is a multi-threaded processor, wherein the first bus unit access setting is determined for a first instruction thread of the multi-threaded processor and the second bus unit access setting is determined for a second instruction thread of the multi-threaded processor, wherein the first instruction thread is different than the second instruction thread.

24. The method of claim 13, wherein the first quality of service parameter includes at least one of a hardware data prefetch priority, a hardware instruction prefetch priority, a software data prefetch priority, and a software instruction prefetch priority.

25. A non-transitory computer readable medium storing processor executable instructions that, when executed by a processor, cause the processor to:
  determine a first bus unit access setting for a first instruction thread;
  determine a second bus unit access setting for a second instruction thread, wherein the second bus unit access setting is different than the first bus unit access setting; and
  selectively discard a prefetch request associated with an instruction based on one of the first bus unit access setting and the second bus unit access setting, wherein discarding the prefetch request prevents the prefetch request from causing data or instructions to be prefetched.

26. The non-transitory computer readable medium of claim 25, wherein selectively discarding the prefetch request includes selectively discarding prefetch requests from multiple instruction threads on a thread by thread basis, each instruction thread of the multiple instruction threads having a corresponding bus unit access setting.

27. The non-transitory computer readable medium of claim 25, wherein the prefetch request comprises a request of a cache to retrieve the data or instructions from a memory before the data or instructions are needed by an execution unit.

28. The non-transitory computer readable medium of claim 25, further comprising processor executable instructions that, when executed by the processor, cause the processor to receive a first quality of service parameter from a first status register associated with the first instruction thread and a second quality of service parameter from a second status register associated with the second instruction thread.

29. The non-transitory computer readable medium of claim 28, wherein the first quality of service parameter includes at least one of a hardware data prefetch priority, a hardware instruction prefetch priority, a software data prefetch priority, or a software instruction prefetch priority.

30. The non-transitory computer readable medium of claim 25, further comprising processor executable instructions that, when executed by the processor, cause the processor to permit execution units to retrieve data from a memory in response to cache miss events.

31. The non-transitory computer readable medium of claim 25, wherein the first bus unit access setting and the second bus unit access setting are determined via access to a control register.

* * * * *